(12) United States Patent
Freitag

(10) Patent No.: US 7,645,850 B2
(45) Date of Patent: Jan. 12, 2010

(54) POLY(BLOCK-PHOSPHONATO-ESTER) AND POLY(BLOCK-PHOSPHONATO-CARBONATE) AND METHODS OF MAKING SAME

(75) Inventor: Dieter Freitag, Chelmsford, MA (US)

(73) Assignee: FRX Polymers, Inc., Chelmsford, MA (US)

( * ) Notice: Subject to any disclaimer, the term of this patent is extended or adjusted under 35 U.S.C. 154(b) by 286 days.

(21) Appl. No.: 11/463,803

(22) Filed: Aug. 10, 2006

(65) Prior Publication Data

US 2007/0129511 A1    Jun. 7, 2007

Related U.S. Application Data

(60) Provisional application No. 60/707,304, filed on Aug. 11, 2005, provisional application No. 60/707,323, filed on Aug. 11, 2005.

(51) Int. Cl.
*C08G 64/00* (2006.01)
*C08G 63/02* (2006.01)

(52) U.S. Cl. .................. 528/196; 525/415; 525/462; 525/464; 525/474; 528/198; 528/201; 528/202

(58) Field of Classification Search ................. 525/415, 525/462, 464, 474; 528/196, 198, 201, 202
See application file for complete search history.

(56) References Cited

U.S. PATENT DOCUMENTS

| | | | |
|---|---|---|---|
| 2,435,252 A | 2/1948 | Eon Toy Arthur Dock | |
| 2,534,242 A | 12/1950 | Cusic | |
| 2,682,522 A | 6/1954 | Coover. Jr. et al. | |
| 2,716,101 A | 8/1955 | Coover. Jr. et al. | |
| 2,891,915 A | 6/1959 | McCormack et al. | |
| 2,925,206 A | 2/1960 | Hancock | |
| 2,925,208 A | 2/1960 | Wood | |
| 3,153,008 A | 10/1964 | Fox | |
| 3,271,329 A | 9/1966 | Coover Jr. et al. | |
| 3,326,852 A | 6/1967 | Thomas | |
| 3,442,854 A | 5/1969 | Curtius et al. | |
| 3,719,727 A | 3/1973 | Masai et al. | |
| 3,829,405 A | 8/1974 | Cohen et al. | |
| 3,830,771 A | 8/1974 | Cohen et al. | |
| 3,919,363 A | 11/1975 | Ura et al. | |
| 3,925,303 A | 12/1975 | Rio et al. | |
| 3,932,351 A | 1/1976 | King | |
| 3,932,566 A | 1/1976 | Reader | |
| 3,946,093 A | 3/1976 | Koto et al. | |
| 3,952,072 A | 4/1976 | Yonemitsu et al. | |
| 4,033,927 A | 7/1977 | Borman | |
| 4,046,724 A | 9/1977 | Kato et al. | |
| 4,048,106 A | 9/1977 | Hermans | |
| 4,064,107 A | 12/1977 | Stackman et al. | |
| 4,078,016 A | 3/1978 | Kramer | |
| 4,093,582 A | 6/1978 | Mark et al. | |
| 4,152,373 A | 5/1979 | Honig | |
| 4,223,104 A | 9/1980 | Kim et al. | |
| 4,229,552 A | 10/1980 | Shiozaki et al. | |
| 4,254,177 A | 3/1981 | Fulmer | |
| 4,322,520 A | 3/1982 | Schmidt et al. | |
| 4,328,174 A | 5/1982 | Schmidt et al. | |
| 4,331,614 A | 5/1982 | Schmidt et al. | |
| 4,332,921 A | 6/1982 | Schmidt et al. | |
| 4,350,793 A | 9/1982 | Schmidt et al. | |
| 4,374,971 A | 2/1983 | Schmidt et al. | |
| 4,377,537 A | 3/1983 | Block et al. | |
| 4,401,802 A | 8/1983 | Schmidt et al. | |
| 4,408,033 A | 10/1983 | Hefner, Jr. | |
| 4,415,719 A | 11/1983 | Schmidt et al. | |
| 4,430,492 A | 2/1984 | Schreckenberg et al. | |
| 4,474,937 A | 10/1984 | Bales | |
| 4,481,350 A | 11/1984 | Schmidt et al. | |
| 4,508,890 A | 4/1985 | Schmidt et al. | |
| 4,580,110 A | 4/1986 | Bhattacharya et al. | |
| 4,594,404 A | 6/1986 | Kawakami et al. | |
| 4,636,737 A | 1/1987 | Bhattacharya et al. | |
| 4,719,279 A | 1/1988 | Kauth et al. | |
| 4,762,905 A | 8/1988 | Schmidt et al. | |
| 4,782,123 A | 11/1988 | Kauth et al. | |
| 4,788,259 A | 11/1988 | Nielinger et al. | |
| 5,003,029 A | 3/1991 | Ueda et al. | |
| 5,034,056 A | 7/1991 | vonBonin | |
| 5,039,775 A | 8/1991 | Oyaizu | |
| 5,086,153 A | 2/1992 | Oyaizu | |

(Continued)

FOREIGN PATENT DOCUMENTS

EP    0077493 B1    3/1987

(Continued)

OTHER PUBLICATIONS

Schmidt et al., Aromatische Polyphosphonate: Thermoplastische Polymere von extremer Brandwidrigeit. 1985. Die Angewandte Makromolekulare Chemie, 132(2165):1-18.
Billmeyer, Textbook of Polymer Science, $2^{nd}$ ed., Wiley Interscience, New York, 1971, pp. 45-52.
Legrand et al., eds., Handbook of Polycarbonates, Marcel Dekker, Inc., New York, 2000 (TOC).
Cotter et al., Engineering Plastics: A Handbook of Polyarylethers, Science Publ. S.A., Switzerland 1995 (TOC).
Groggins, Unit Processes in Organic Synthesis, $4^{th}$ ed., McGraw Hill Book Co., 1952, pp. 616-620.
Morgan, Condensation Polymers, Wiley Interscience, New York, 1965, pp. 217-223.
Schmidt et al., Aromatische Polyphosphonate: Thermoplastische Polymere von extremer Brandwidrigeit, 1985, Die Angewandte Makromolekulare Chemie, 132(2165):1-18.
Billmeyer, Textbook of Polymer Science, $2^{nd}$ ed., Wiley Interscience, New York, 1971, pp. 45-52.

(Continued)

*Primary Examiner*—Terressa M Boykin
(74) *Attorney, Agent, or Firm*—Pepper Hamilton LLP

(57) ABSTRACT

Compositions including poly(block-phophonato-esters) or poly(block-phosphonato-carbonate) and a process for making them from oligomeric phosphonates and/or polyphosphonates and polyester and/or polycarbonates are disclosed. The compositions provide tough flame retardant materials and coatings.

49 Claims, No Drawings

U.S. PATENT DOCUMENTS

| | | | |
|---|---|---|---|
| 5,216,113 A | 6/1993 | Schulz-Schlitte et al. | |
| 5,319,058 A | 6/1994 | Hattori et al. | |
| 5,334,692 A | 8/1994 | Hess et al. | |
| 5,525,681 A | 6/1996 | Barron et al. | |
| 5,639,800 A | 6/1997 | VonBonin et al. | |
| 5,719,200 A | 2/1998 | Staendeke et al. | |
| 5,919,844 A | 7/1999 | Shimizu et al. | |
| 6,066,700 A | 5/2000 | Konig et al. | |
| 6,128,214 A | 10/2000 | Kuekes et al. | |
| 6,153,212 A * | 11/2000 | Mao et al. | 424/426 |
| 6,256,767 B1 | 7/2001 | Kuekes et al. | |
| 6,288,210 B1 | 9/2001 | Shobha et al. | |
| 6,291,630 B1 | 9/2001 | Konig et al. | |
| 6,314,019 B1 | 11/2001 | Kuekes et al. | |
| 6,861,499 B2 | 3/2005 | Vinciguerra et al. | |
| 2004/0167284 A1 | 8/2004 | Vinciguerra et al. | |
| 2005/0020800 A1 | 1/2005 | Levchik et al. | |
| 2005/0222370 A1 | 10/2005 | Freitag et al. | |
| 2006/0020104 A1 | 1/2006 | Freitag | |

FOREIGN PATENT DOCUMENTS

| | | |
|---|---|---|
| EP | 0962521 * | 12/1999 |
| EP | 1026191 A1 | 9/2000 |
| GB | 2043083 | 1/1980 |
| WO | 99/46315 A1 | 9/1999 |
| WO | WO 99/46315 A1 | 9/1999 |
| WO | 03/029258 A1 | 4/2003 |
| WO | WO 03/029258 A1 | 4/2003 |
| WO | 2004/076536 | 9/2004 |
| WO | 2004/076537 | 9/2004 |
| WO | WO 2004/076536 | 9/2004 |
| WO | WO 2004/076537 | 9/2004 |

OTHER PUBLICATIONS

Legrand et al., eds., Handbook of Polycarbonates, Marcel Dekker, Inc., New York, 2000 (TOC).

Levchik et al., Overview of Recent Developments in the Flame Retardancy of Polycarbonates, Polymer International, 54(7):981-998.

Cotter et al., Engineering Plastics: A Handbook of Polyarylethers, Science Publ, S.A., Switzerland 1995 (TOC).

Groggins, Unit Processes in Organic Synthesis, $4^{th}$ ed., McGraw Hill Book Co., 1952, pp. 616-620.

Morgan, Condensation Polymers, Wiley Interscience, New York, 1965, pp. 217-223.

American Society for Test Methods; Test ASTMD2863; http://www.astm.orq/cgi-bin/SoftCart.exe/Database.Cart/Redline p./D2863,HTM?L+mvstore+ttqw1337.

Levchik et al., Overview of Recent Developments in the Flame Retardancy of Polycarbonates, Polymer International, 2005, 54(7):981-998.

American Society for Test Methods; Test ASTMD2863; 2006 htto://www.astm.orq/cgi-bin/SoftCart.exe/Database.Cart/Redline p./D2863.HTM?L+mystore+ttqw1337.

* cited by examiner

POLY(BLOCK-PHOSPHONATO-ESTER) AND POLY(BLOCK-PHOSPHONATO-CARBONATE) AND METHODS OF MAKING SAME

CROSS REFERENCES AND RELATED APPLICATIONS

The application claims priority for U.S. Provisional Application No. 60/707,304 entitled "Polymers Comprising Polyphosphonates and Polyesters and Methods of Making" filed on Aug. 11, 2005 and U.S. Provisional Application No. 60/707,323 entitled Polymers Comprising Polyphosphonates and Polyesters and Methods of Making" filed Aug. 11, 2005.

BACKGROUND

Random polyester-phosphonates and random polycarbonatophosphonates can be prepared by melt condensation from bisphenol, phosphonic acid ester monomers and carboxylic acid ester monomers or from bisphenol, phosphonic acid ester monomers and diphenyl carbonate monomers (See for example, DE-OS (German Published Specification) Nos. 2,925,206 and 2,925,208). The polymers made using these methods are random (or statistical) mixtures of the monomers and these materials do not have good toughness compared to polycarbonate alone.

In U.S. Pat. No. 4,782,123 coplyhosphonates are prepared by extrusion of solutions of aromatic polyesters and aromatic polyphosphonates at elevated temperatures to give copolyphosphonates. This process requires the use and then subsequent removal of organic solvent from the product mixture. This extra process and the attendant disposal of the organic solvent make this process undesirable and costly.

In U.S. Pat. No. 4,762,905 thermoplastic polyphosphonatocarbonates are prepared by polycondensation of at least one aromatic dihydroxy compound with a diaryl carbonate and a phosphonic acid diaryl ester in the presence of a basic polycondensation catalyst with heating under reduced pressure. These methods, again, provide statistical mixing of carbonate and phosphonate monomers in the polymer. Where blocks of phosphonate or carbonate occur in the polymer, it is difficult to control their length. The block polymer prepared from the monomers does not have good toughness compared to the polycarbonate or a good limiting oxygen index compared to the polyphosphonate.

In U.S. Pat. No. 4,508,890 thermoplastic polyphosphonatocarbonates are prepared by polycondensation of at least one aromatic dihydroxy compound with a diaryl carbonate and a phosphonic acid diaryl ester in the presence of a neutral catalyst. Neutral catalysts are expensive and do not provide control over polyphosphonate block size in the block polymer. Also, where the neutral catalysts remains in the final polymer product, it may cause problems such as increased haze, reduced hydrolytic stability, reduced optical transparency, increased color and can catalyze the thermal degradation of the polymer during use at elevated temperature. The block polymer prepared from the monomers and neutral catalyst does not have good toughness compared to the polycarbonate or a good limiting oxygen index compared to polyphosphonate.

SUMMARY

Embodiments of the invention described herein, may include a polymer comprising at least one phosphonate oligomer or polyphosphonate and one or more polyester or polycarbonate covalently linked to the at least one phosphonate oligomer or polyphosphonate to form a poly(block-phosphonato-ester) or polyblock-phosphonato-cabonate). In some embodiments, the at least one phosphonate oligomer or poly phosphonate and one or more polyester or polycarbonate may be linked to one another by a tranesterification or polycondensation, and in certain embodiments, the poly(block-phosphonato-ester) and/or poly(block-phosphonato-cabonate) may have a single glass transition temperature ($T_g$).

The phosphonate oligomer or polyphosphonate, of embodiments of the invention, may have a solution viscosity ($\eta_{rel}$) of from about 1.03 to greater than about 1.35 and may have a $T_g$ of from about 28° C. to about 107° C. In some embodiments the phosphonate oligomer or polyphosphonate may be branched or linear and may be prepared with up to about 50 mol % branching agent. In other embodiments, the phosphonate oligomer of polyphosphonate may have a molecular weight ($M_n$) of from about 2,000 g/mol to about 35,000 g/mol, and, in certain embodiments, the phosphonate oligomrer or polyphosphonate may be prepared from at least a stoichiometrically imbalanced mixture of a phosphoric acid diaryl ester and a bidphenol.

The polyester or polycarbonate of embodiments of the invention may be an aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, poly(butylene adipate), poly(hexamethylene sebacate), aromatic and aliphatic co-polyesters and combinations thereof.

In embodiments of the invention, the block polymer described above may further comprise a second polymer which may be any polymer or plastic such as, hut not limited to, plastics, polycarbonates (PCs), polyacrylonitriles, polystyrenes, polyamides, glassfilled or non-glassfilled polyamides, more specifically, PA 6, PA 6.6, PA 4.6, polyesters, glassfilled or non-glassfilled polyester, more specifically, polyeth-ylene terephthalate (PET), polybutylene terephthalate (PBT), polyurethanes, poiyureas, polyepoxys, polyimides, polyarylate, poly(arylene ether), polyethylene, polyethylene oxide, polyphenylene sulfide, polypropylene, polyphenylene oxide (PPO), poly(vinyl ester), polyvinyl chloride, bismaleimide polymer, polyanhydride, polyacrylonitrile butadiene styrenes (ABS), AMS/PCs, high-impact polystyrenes (HIPS), PPO/HIPS, liquid crystalline polymer, cellulose polymer, or combinations thereof The second polymer may be blended with the polymer using a mixing, blending or compounding method known in the art such as, but not limited to, melt mixing.

Embodiments of the invention also provide for a method for making block polymers comprising: combining at least one phosphonate oligomer or polyphosphonate with one or more polyester or polycarbonate to form a mixture; providing a transesterification catalyst wherein a reaction mixture is formed when the transesterification catalyst is provided; heating the reaction mixture; and removing volatile reaction by-products, wherein a polyblock-phosphonato-ester) and/or poly(block-phosphonato-cabonate) is formed when substantially no volatile reaction by-products are being generated. The method of some embodiments of the invention may further include a second heating step wherein the poly(block-phosphonato-ester) or poly(block-phosphonato-cabonate) may be heated for at least about 5 hours, and the second heating step may increase the $M_n$ of the poly(block-phosphonato-ester) or poly(block-phosphonato-cabonate).

The polyphosphonate oligomer or polyphosphonate blocks in the block polymers of the invention may be from at least about 20 wt % to about 99.5 wt % relative to the total poly(block-phosphonato-ester) and/or poly(block-phosphonato-carbonate), and in some embodiments, the phosphonate oligomer or polyphosphonate blocks may be from at least about 0.5 wt % to about 20 wt % relative to the total weight of the poly(block-phosphonato-ester) and/or poly(block-phosphonato-cabonate).

The transesterifiacation catalyst provided in embodiments of the invention may be provided with at least one of the phosphonate oligomer or polyphosphonate and may be the same transesterification catalyst used in a reaction for preparing the phosphate oligomer or polyphosphonate, or the transesterification catalyst may be provided by a step of adding a transesterification catalyst. In certain embodiments, the transesterification catalyst may be a basic transesterification catalyst.

In some embodiments of the invention, the method may further include blending the poly(block-phosphonato-ester) or poly(block-phosphonato-cabonate) with a second polymer, and in other embodiments blending the poly(block-phosphonato-ester) or poly(block-phosphonato-cabonate) and the second polymer may include melt blending the poly(block-phosphonato-ester) and/or poly(block-phosphonato-cabonate) and the second polymer and removing volatile by-products. In embodiments of the invention the second polymer may be plastics, polycarbonates (PCs), polyacrylonitriles, polystyrenes, polyamides, glassfilled polyamides, non-glassfilled polyamides, PA 6, PA 6.6, PA 4.6, polyesters, glassfilled polyesters, union-glassfilled polyesters, polyethylene terephthalate (PET), polybutylene terephthalate (PBT), polyurethanes, polyureas, polyepoxys, polyimides, polyarylate, poly(arylene ether), polyethylene) polyethylene oxide, polyphenylene sulfide, polypropylene, polyphenylene oxide (PPO), poly(vinyl ester), polyvinyl chloride, bismaleimide polymer, polyanhydride, polyacrylonitrile butadiene styrenes (ABS), ABS/PCs, high-impact polystyrenes (HIPS), PPO/HIPS, liquid crystalline polymer, cellulose polymer, or combinations thereof.

The phosphonate oligomer or polyphosphonate, of embodiments of methods of the invention, may have a solution viscosity ($\eta_{rel}$) of from about 1.03 to greater than about 1.35 and may have a $T_g$ of from about 28° C. to about 107° C. In some embodiments, the phosphonate oligomer or polyphosphonate may be branched or linear and may be prepared with up to about 50 mol % branching agent. In other embodiments, the phosphonate oligomer of polyphosphonate may have a molecular weight ($M_n$) of from about 2,000 glmol to about 35,000 g/mol, and, in certain embodiments, the phosphonate oligomer or polphosphonate may be prepared from at least a stoichiometrically imbalanced mixture of a phosphoric acid diaryl ester and a bidphenol.

The polyester or polycarbonate of embodiments of the method of the invention may be an aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, polybutylene adipate), poly(hexamethylene sebacate), aromatic and aliphatic co-polyesters and combinations thereof Embodiments of the invention also include poly(block-phosphonato-ester) and/or poly(block-phosphonato-cabonate) prepared using the methods described above. The method of embodiments may include a second heating step whereby the $M_n$ of the poly(block-phosphonato-ester) and/or poly(block-phosphonato-cabonate) is increased and the addition of a second polymer to a blend with the polyblock-phosphonato-ester) and/or poly(block-phosphonato-cabonate).

Still other embodiments of the invention include a polymer blend comprising a poly(block-phosphonato-ester) and/or polyblock-phosphonato-cabonate) made by transesterification or polycondensation of at least one phosphonate oligomer of polyphosphonate and one or more polyester or polycarbonate, and a second polymer. In some embodiments, the poly(block-phosphonato-ester) and/or poly(block-phosphonato-cabonate) and the second polymer may be blended using a melt process.

The phosphonate oligomer or polyphosphonate, of embodiments of the invention, may have a solution viscosity ($\eta_{rel}$) of from about 1.03 to greater than about 1.35 and may have a $T_g$ of from about 28° C. to about 107° C. In some embodiments the phosphonate oligomer or polyphosphonate may be branched or linear and may be prepared with up to about 50 mol % branching agent. In other embodiments, the phosphonate oligomer or polyphosphonate may have a molecular weight ($M_n$) of from about 2,000 g/mol to about 35,000 gmol, and, in certain embodiments, the phosphonate oligomer or polyphosphonate may be prepared from at least a stoichiometrically imbalanced mixture of a phosphoric acid diaryl ester and a bidphenol.

The polyester or polycarbonate that form the block polymers of embodiments of the invention may be an aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, polybutylene adipate), poly(hexamethylene sebacate), aromatic and aliphatic co-polyesters and combinations thereof The polester in some embodiments may have a $M_w$ of from about 20,000 gmol to about 35,00 g/mol.

DETAILED DESCRIPTION

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Thus, for example, reference to a "polycarbonate" is a reference to one or more polycarbonates and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described. All publications mentioned herein are incorporated by reference. Nothing herein is to be construed as an admission that the present disclosure is not entitled to antedate these references.

"Optional" or "optionally" means that the subsequently described event or circumstance may or may not occur, and that the description includes instances where the event occurs and instances where it does not.

Embodiments of the present invention may generally be directed to poly(block-phosphonato-ester) and poly(block-phosphonato-carbonate) prepared by the transesterification or polycondensation of oligomeric phosphonates and/or polyphosphonates with polyesters and/or polycarbonates.

As used herein the terms "poly(block-phosphonato-ester)" and "poly(block-phosphonato-carbonate)" refer to polymers made up of olgomeric phosphonate or polyphosphonate and polyester or polycarbonate blocks.

Embodiments of the invention may also include methods used to prepare poly(block-phosphonato-ester) and poly (block-phosphonato-carbonate). In such embodiments, at least one oligomeric phosphonate and/or polyphosphonate and one or more polyester and/or polycarbonate may be combined to form a mixture. A transesterification catalyst may be provided to the mixture. In some embodiments, the transesterification catalyst may be provided as residual transesterification catalyst from the reaction mixture used to prepare the oligomeric phosphonate and/or polyphosphonate, and in others, the transesterification catalyst may be provided in a separate step of adding a transesterification catalyst. The reaction mixture which may include a transestereification catalyst may then he heated and generated volatile reaction by-products may be removed. The reaction may produce the poly (block-phosphonato-ester) and poly(block-phosphonato-carbonate).

The poly(block-phosphonato-ester) and poly(block-phosphonato-cabonate) of embodiments of invention may exhibit superior properties, such as, but not limited to, improved impact strength, thermal stability, flame retardance, and combinations of these compared to those of blends including polyphosphonate and polyester and/or polycarbonate prepared by conventional methods such as, for example, melt mixing. Without wishing to be bound by theory, these improved properties may arise from the chemical linkage formed between the blocks of the poly(block-phosphonato-ester) and poly(block-phosphonato-cabonate) of the invention. For comparative example, blends prepared using conventional methods are not chemically linked, as evidenced by the distinct $T_g$s normally exhibited in blends of these polymers. Random poly(phosphonatoester) and random poly (phosphonatocarbonate) prepared by reacting bisphenol, a phosphoric acid diphenylester, and a carboxylic acid diphenylester monomer and/or diphenylcarbonate monomer together at the same time, results in a statistical mixtures of the monomers having no blocks or no blocks of sufficient length to provide the characteristics of the poly(block-phosphonato-ester) and poly(block-phosphonato-cabonate) of the invention.

In contrast, the methods and compositions of the present invention allow control over the block size of both the oligomeric phosphonate and/or polyphosphonate and polyester and/or polycarbonate in the resulting poly(block-phosphonato-ester) and/or poly(block-phosphonato-cabonate). In some embodiments, the block size is controlled by the choice of the polymer and or oligomeric starting material. Therefore without wishing to be bound by theory, the number (weight percent) and block length (block size) of oligomeric phosphonate and or polyphosphonate units used to prepare the poly(block-phosphonato-ester) and/or poly(block-phosphonato-cabonate) as well as the number and block length of the polyester and/or polycarbonate units may be responsible for the improved properties of the block polymer. The presence and type of other components, such as, for example, the type of bisphenol or the presence and type of branching agent may also contribute to the improved properties. For example, the degree of branching in the resulting poly(block-phosphonato-ester) and/or poly(block-phosphonato-cabonate) may be controlled by choice of linear or branched oligomeric phosphonates and/or polyphosphonates, by the choice of linear or branched polyester, linear or branched polycarbonate or combinations of these, and the $M_w$ choice of bisphenol in the oligomeric phosphonate and/or polyphosphonate may control the phosphorous content of the final block polymer. The choice of components may control the flame retardancy, toughness, and heat stability ($T_g$).

The mixing ratio of the polyphosphonate with the polyester may also control the properties of the poly(block-phosphonato-ester) and/or poly(block-phosphonato-cabonate) of the invention. In some embodiments, the poly(block-phosphonato-ester) and/or poly(block-phosphonato-cabonate) may be made up of at least about 20% to about 99.5% phosphonate oligomer and/or polyphosphonate. The polyester and/or polycarbonate may then make up the remainder of the polymer or from about 0.5% to about 80% of the final poly(block-phosphonato-ester) and/or poly(block-phosphonato-cabonate).

Advantageously, embodiments of the present invention may provide poly(block-phosphonato-ester)and/or poly (block-phosphonato-cabonate) with a higher limiting oxygen index and flame retardancy polyester or polycarbonate alone and better toughness, higher glass transition temperature (Tg) than oligomeric phosphonate and/or polyphosphonate alone. Moreover, the use of halogens which may be found in other flame retardant polymeric materials may be reduced or eliminates halogens. Therefore, the poly(block-phosphonato-ester) and/or poly(block-phosphonato-cabonate)of embodiments of the invention may be useful for a variety of applications. For example, the polyblock-phosphonato-ester) and/or poly(block-phosphonato-cabonate), may provide flame retardant materials for purposes of providing housing for a variety of electronic equipment such as, but not limited to, televisions, computers, computer monitors, telephones, and cellular telephones. In other embodiments, these block polymers may provide an optically transparent and flame retardant coating for an underlying substrate such as, for example, fibrous material, cloth, metal, wire, other plastic materials, and the like.

The oligomeric phosphonates and or polyphosphonates that may be used to make the poly(block-phosphonato-ester) and/or poly(block-phosphonato-cabonate) of embodiments of the invention may have an $\eta_{rel}$ of greater than about 1.03 as measured in 0.5% $CH_2Cl_2$, and, in certain embodiments, from about 1.03 to about 1.35. In some embodiments, the $\eta_{rel}$ may be from about 1.04 to about 1.18, and in other embodiments, from about 1.18 to about 1.35. The $T_g$ of the oligomeric phosphonates and/or polyphosphonates for use in embodiments of the invention may be from about 28° C. to about 107° C., in some embodiments from about 28° C. to about 105° C., and in still other embodiments from about 28° C. to about 100 AC. The oligomeric phosphonates and/or polyphosphonates used in embodiments may be linear, branched, or combinations of these, Molecular weights ($M_n$) for oligomeric phosphonates and/or polyphosphonates used in embodiments of the invention can range from about 2,000 to about 35,000 g/mol in some embodiments, from about 4,000 to about 18,000 g/mol in other embodiments, and from about 18,000 to about 35,000 g/mol in still others. Blocks or groups of branched or linear oligomeric phosphonates and/or polyphosphonates in the final poly(block-phosphonato-ester) and/or poly(block-phosphonato-cabonate) may have an $M_n$ greater than 2,000 g/mol in some embodiments and greater than 8,000 g/mol in other embodiments.

In certain embodiments of the invention, oligomeric phosphonates and/or polyphosphonates may be prepared using the method described in U.S. patent application Ser. No. 11/143, 230 filed Jun. 2, 2005 incorporated herein by reference in its entirety. Briefly, the method for preparing oligomeric phosphonates and polyphosphonates may include combining one or more phosphonate, such as phosphonic acid diaryl ester, with one or more bisphenol to form a mixture and, optionally, a tranesterification catalyst and/or branching catalyst. The mixture may then be heated and volatiles generated as by-products of the polymerization reaction may be removed. Heating of the mixture may continue until the desired oligomeric phosphonate and/or polyphosphonate has been produced. In some embodiments, the reaction time may be varied to obtain the desired molecular weight of product oligomeric phosphonates and/or polyphosphonates, and in other embodiments, heating is stopped when the evolution of phenol has essentially stopped or has stopped.

Phosphonic acid diaryl esters, alternatively called phosphodiesters, used for making oligomeric phosphonates and/or polyphosphonates may include those of formula (1):

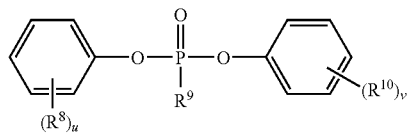

(1)

where each $(R^8)_u$, and each $(R^{10})_v$ can independently be a hydrogen, lower alkyl of $C_1$-$C_4$, and u and v are independently integers where u=1 to 5, and v=1 to 5; $R^9$ can be lower alkyl $C_1$-$C_4$. In embodiments, the phosphonic acid diaryl ester includes methyl-phosphonic acid diphenyl ester or methyldiphenoxyhosphine oxide where $R^9$ can be an alkyl radical or group, may be a methyl radical or group.

Phosphodiester, such as those of formula (1), used to prepare oligomeric phosphonate and/or polyphosphonates in embodiments of the invention may have a molar ratio: phosphodiester of structure 1 up to ±50 mol % related to bisphenol, in some embodiments up to ±20 mol %, and in other embodiments up to ±10 mol %.

Phosphoric triaryl esters of general formula (2) may also be used, as a branching agent, to make oligomeric phosphonates and/or polyphosphonates.

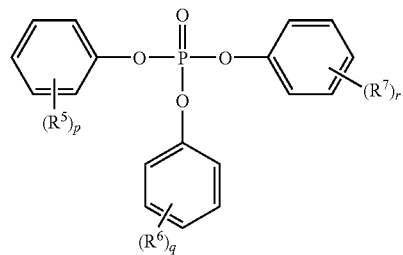

(2)

where each $(R^5)_p$, $(R^6)_q$, and $(R^7)_r$ can independently be a hydrogen, lower alkyl of $C_1$-$C_4$, and where p, q, and r are integers independently ranging from 1 to 5. In certain embodiments, the branching agent may be phosphoric triaryl ester is phosphoric triphenyl ester.

In the preparation of oligomeric phosphonates and/or polyphosphonates where a branching agent is used, for example where the hydroxy aromatic compound cannot split like bisphenol A to form poly-hydroxylated compounds in situ, the branching agent may contain at least more than two functional groups that can be hydroxyl or phosphorus ester. Examples of branching agents may include, but not be limited to. 1,1,1-tris(4-hydroxyphenyl)ethane, triphenyl phosphate, oligomeric isopropenyl phenol and others.

Trihydroxy, tetrahydroxy, or oligoydroxy (phenol-formaldehyde resins) compounds are branching agents that may also be used for preparing branched oligomeric phosphonates and/or polyphosphonates of embodiments of the invention. Trihydroxy and tetrahydroxy compounds may include, but are not limited to, phloroglucinol; 4,6-dimethyl-2,4,6-tri-(4-hydroxy phenyl)-2-heptene; 4,6-dimethyl-2,4,6-tri-(4-hydroxy phenyl)-heptane; 1,3,5-tri-(4-hydroxy phenyl)-benzene; 1,1,1-tri-(4-hydroxy phenyl)-ethane; tri-(4-hydroxy phenyl)-phenyl methane; 2,2-bis-[4,4-bis-(4-hydroxy phenyl)-cyclohexyl]-propane; 2,4-bis-(4-hydroxy phenyl)isopropyl phenol; 2,6-bis-(2'-hydroxy-5'-methyl benzyl)-4-methyl phenol 2-(4-hydroxy phenyl)-2-(2,4-dihydroxy phenol)-propane; tetra-(4-hydroxy phenyl)methane; tetra-[4-(4-hydroxy phenyl isopropylphenoxy]-methane and 1,4-bis-(4,4-dihydroxy triphenyl methyl)-benzene or Mixtures of these.

In embodiments including a branching agent in the mixture, phosphonate and bisphenol may be provided in sufficient concentration to react, or completely react, with the branching agent while retaining a stoichiometric imbalance of the bisphenol or phosphonate in the mixture. The amount of branching agent used in embodiments (relative to bisphenol) may be from about 0.0005 moles to about 0.5 moles, with the range of about 0.001 moles to about 0.5 moles per one mole of bisphenol being preferred, and a range of about 0.01 to about 0.1 being most preferred. A branching agent that may be used in other embodiments to form the phosphonate oligomers and/or polyphosphonates can include but is not limited to triphenyl phosphate. In other embodiments having a branching agent included in the mixture, the branching agent may be present in up to about 10 mol %, and in other embodiments, the branching agent may be present in up to about 50 mol %.

Various dihydroxy aromatic compounds or bisphenols may be used alone or in combination with one another to form oligomeric phosphonates and/or polyphosphonates for use in embodiments of the invention. These dihydroxy aromatic compounds may be but are not limited to those of general formula (3):

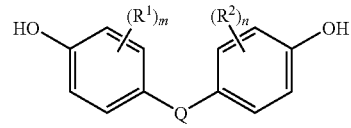

(3)

where each $(R^1)_m$ and $(R^2)_n$ can independently be a hydrogen, halogen atom, nitro group, cyano group, $C_1$-$C_{20}$ alkyl group, $C_4$-$C_{20}$ cycloalkyl group, or $C_6$-$C_{20}$ aryl containing group; m and n are independently integers 1 to 4; and Q may be a bond, oxygen atom, sulfur atom, or $SO_2$ group for non-splitable bisphenols, and for splitable bisphenols Q may be the group

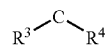

where $R^3$ and $R^4$ can independently be a hydrogen atom, lower alkyl $C_1$-$C_4$ alkyl group, aryl, and substituted aryl. $R^3$ and $^4$ may combine to form a $C_4$-$C_{20}$ cycloaliphatic ring which is optionally substituted by one or more $C_1$-$C_{20}$ alkyl groups, aryl groups, or a combination these.

One or more bisphenol may be used to prepare oligomeric phosphonates and/or polyphosphonates, and these bisphenols may include, but not be limited to bisphenol A, resorcinol, hydroquinone, and mixtures of these or mixtures including other bisphenols of formula (3) such as, but not limited to, 2,2-bis(4-hydroxy-3-methylphenyl)propane, 2,2-bis(3-chloro-4-hydroxyphenyl)propane, 2,2-bis(3-bromo-4-hydroxyphenyl)propane, 2,2-bis(4-hydroxy-3-isopropylphenyl)propane, 1,1-bis(4-hydroxyphenyl)cyclohexane, 1,1-bis (4-hydroxy-3-methylphenyl)cyclohexane, 4,4,'-dihydroxydiphenyl, 4,4'-dihydroxydiphenylether, 4,4'-dihydroxydiphenylether, 4,4' dihydroxydiphenylsulfone, 9,9-dihydroxy-diphenylfluorene, 1,1-bis(4-hydroxyphenyl)-3,3-dimethyl-5-methylcyclohexane (TMC). Other bisphenols such as resorcinol and hydroquinone and mixtures of these with or without one or more bisphenol of structure (3) may also be useful in embodiments of the invention.

For example, the amount of bisphenol A, in embodiments of the invention, may range from about 100% to about 0.5% related to other bisphenols. In some embodiments, the phosphorous content of polymers of embodiments of the invention may be controlled by the molecular weight ($M_w$) of the bisphenol used in the oligomeric phosphonates or polyphosphonates. In particular, a lower molecular weight bisphenol will produce a higher the phosphorous content oligomeric phophonate and/or polyphosphonate. For example, bisphenols such as resoreinol, hydroquinone, or combinations of these or similar low molecular weight bisphenols may be used to make oligomeric phosphonates and/or polyphosphonates with high phosphorous content.

The transesterification catalyst may be any transesterification catalyst. In some embodiments, the tranesterifileation catalyst is a non-neutral transesterification catalyst, such as, for example, phosphonium tetraphenylphenolate, metal phenolate, sodium phenolate, sodium or other metal salts of bisphenol A, ammonium phenolate, non-halogen containing transesterification catalysts and the like, or transesterification catalysts such as those disclosed in PCT Pat. Application Serial Numbers PCT/US 2004005337 and PCT/US 2004005443 filed Feb. 24, 2004 incorporated herein by reference in their entirety.

In embodiments of the invention directed to preparing the one or more oligomeric phosphonate and/or polyphosphonate, one or more bisphenol may be present in a stoichiometric excess which may be up to about 50 mol % relative to the phosphoric acid diarylester. In some embodiments, the stoichiometric excess may be from about 2 or 3 mol % to up to about 15 or 16 mol %t and in other embodiments, the stoichiometric excess may be from about 5 mol % to about 15 mol %, from about 5 mol % to about 25 mol %, or from about 5 to about 50 mol %.

In other embodiments directed to preparing the one or more oligomeric phosphonate and/or polyphosphonate, the mixture of phosphoric acid diarylester and bisphenol may include a molar excess of phosphoric acid diarylester of from about 1 mol % to up to about 30 mol % relative to the bisphenol.

The temperature to which reaction mixtures used to prepare oligomeric phosphonates and/or polyphosphonates may be heated may range from about 150° C. to about 310° C. in embodiments of the invention, and about 250° C. to about 300° C. in other embodiments. In some embodiments, heating may continue for about a day (24 hours), and heating may include heating to several different temperatures in this range during this or another amount of time. In some embodiments, heating may occur as a step-wise process wherein each temperature (step) occurs for a specific duration of time during the course of the polycondensation reaction. and in others, heating may be repeated on a second series of similar stages with an optional additional catalyst. For example in embodiments, the reaction may be run for about 6 to about 12 hours followed by a followed by a second period of time Volatile reaction by-products may be removed as part of methods for preparing oligomeric phosphonates and/or polyphosphonates of embodiments of the invention by any method known in the art including, but not limited to, using reduced pressure, a flow of an inert gas, or combination of these or other methods. In embodiments using reduced pressure, the pressure may be reduced using for example, a vacuum, and the reaction may take place at a pressure of from about 280 to about 0.1 millibar. In other embodiments, a flow of inert gas may be used to remove volatile by-products. In certain embodiments, inert gas may be used in combination with a continuous vacuum. Without wishing to be bound by theory, the amount of hydroxy aromatic compounds and/or other generated by-products removed from the reaction mixture may provide an oligomeric phosphonate and/or polyphosphonate with the $\eta_{rel}$, $T_g$, phosphorous content, LOI, impact strength, or any combination of these necessary to meet the poly(block-phosphonato-ester) and/or poly(block-phosphonato-cabonate) anticipated application and/or processing requirements. In some embodiments removal of a sufficient amount of generated by-product in the reaction of an oligomeric polyphosphonate and/or polyphosphonate with a polyester and/or polycarbonate provides a poly(block-phosphonato-ester) and/or poly(block-phosphonato-cabonate) with a limiting oxygen index greater that of the polyester and/or polycarbonate and a $T_g$ greater than that of the oligomeric phosphonate and/or polyphosphonates used in its production.

Oligomeric phosphonate and/or polyphosphonates prepared in embodiments of the invention may be prepared by a batch, semibatch, or a continuous process. The material and the structure of the reactor used in embodiments of the present invention may not be particularly limited as long as the reactor has the capability of stirring, heating, and reducing pressure and has ports for addition and removal of reagents, solvents, catalyst, and/or reaction by- products. In certain embodiments of the invention, the reactor may be equipped, for example with a temperature controlled condenser or cold finger, for the selective removal of by-product like hydroxy aromatic compounds or phenol derived compounds, or phosphodiester or diphenyl carbonate.

Advantageously lower purity monomers can be used to make the oligomerie phosphonates and/or polyphosphonates. This is a major advantage because it mitigates the need for additional purification steps, which contributes to cost reduction. By following the method of the present invention, branched oligomeric phosphonates and or polyphosphonates can be combined with polyesters like a polycarbonate to form polymers that have advantageous flame resistance, heat stability, toughness, and are melt processable. In addition, a second heating step after the reaction with optionally added catalyst can be used to impart improved hydrolytic stability and extremely clear, haze-free oligomeric phosphonates and or polyphosphonates.

Embodiments of the invention provide for methods for using the oligomeric phosphonates and/or polyphosphonates described hereinabove to make poly(block-phosphonato-ester) and/or poly(block-phosphonato-cabonate) with a controlled amount and size (also referred to as block length) of oligomeric phosphonate and/or polyphosphonates. The ability to control the amount and size distribution of oligomeric phosphonate and/or polyphosphonate and to chemically link the oligomeric phosphonate and/or polyphosphonate to a polyester and/or polycarbonate may be advantageous over those prepared by conventional methods because a uniform product having a single $T_g$ can be prepared. Furthermore, conventional methods for preparing poly(phosphonatoester) and/or poly(phosphonatocabonate) may result in statistical mixtures of phosphonate and carbonate groups. Moreover, conventional methods, including blending of low molecular weight or oligomeric phosphonate and/or polyphosphonate with polyester and/or polycarbonate under conditions where transesterification does not occur, result in a product having low toughness, low heat stability (two distinct $T_g$s) and a low limiting oxygen index. In summary, the block polymers of embodiments of the invention may allow for advantageous properties with respect to the application of the polymer due to the ability to more tightly control the amount and size of the components of the polymer and the chemical linkage between these components.

The poly(block-phosphonato-ester) and/or poly(block-phosphonato-cabonate) of embodiments of the invention may be characterized by being formed from at least one oligomeric phosphonate and/or polyphosphonate and one or more polyester and or polycarbonate where the at least one oligomeric phosphonate and/or polyphosphonate and one or more polyester or polycarbonate may be covalently linked to one another which, in general, may lead to one $T_g$. The poly(block-phosphonato-ester) and/or poly(block-phosphonato-cabonate) of embodiments of the invention may also be characterized as having a higer phosphorous content than the staring polyester, and an improved limiting oxygen index over the starting polyester.

Oligomeric phosphonate and/or polyphosphonates of embodiments of the invention produced as described above may be used to make poly(block-phosphonato-ester) and/or poly(block-phosphonato-cabonate) by combining them with one or more polyester or polycarbonate, such as but not limited to, polyester and polycarbonate polyesters, providing a transeterification catalyst to make a reaction mixture, heating the reaction mixture and removing volatiles.

Polyesters of embodiments of the invention may include any polymer having a ester in the main chain. Polycarbonates, for the purposed of embodiments of the invention, may be considered a type of polyester in which groups of dihydric phenols are linked through carbonate groups. Examples of polyesters that may be used in embodiments of the invention include aromatic and aliphatic polyesters, aromatic and aliphatic polycarbonates, polyalkylene terephthalates, such as, for example, polyethylene terephthalate, and polyalkylene naphthalates, such as, for example, polyethylene naphthalate and polybutylene terephthalate, polycaprolactone, poly(butylene adipate), poly(hexamethylene sebacate) and the like. Aromatic and aliphatic co-polyesters may also be used in embodiments of the invention. Polyesters and/or polycarbonates used in embodiments of the invention may be of any molecular weight ($M_w$), and in certain embodiments may be in the range of about 20,000 to about 35,000 g/mol.

In embodiments of the invention, transesterification catalysts for use in the invention may be provided to the reaction mixture as residual transesterification catalyst used to make the oligomeric phosphonates and polyphosphonates as described above. In these embodiments, the transesterification may not have been used up during the formation of the oligomeric phosphonate and/or polyphosphonate, or may be recycled during the course of the polymerization reaction. In other embodiments, the transesterification catalyst may be provided by the additional step of adding the transesterification catalyst. The added transesterification catalyst may be any transesterification catalyst and may be one of the transesterification catalysts discussed hereinabove. In still other embodiments, additional transesterification catalysts may be added to reaction mixtures in which residual transesterification catalyst is present.

The poly(block-phosphonato-ester) and/or poly(block-phosphonato-cabonate) of the invention may contain oligomeric phosphonate and/or polyphosphonate that may be branched or linear. In embodiments including branched oligomeric phosphonate or polyphosphonate blocks the molecular weight ($M_n$) of the block may be greater than about 2,000 g/mol, and in some embodiments greater than about 8,000 gmol. In other embodiments, the poly(block-phosphonato-ester) and/or poly(block-phosphonato-cabonate) may include linear oligomeric phosphonate and or polyphosphonate blocks having a molecular weights ($M_n$) of greater than about 2,000 g/mol, and in some embodiments linear polyphosphonate segments with a molecular weight ($M_n$) greater than about 8,000 g/mol, In embodiments of the invention, the poly(block-phosphonato-ester) and/or polyblock-phosphonato-cabonate) may be characterized as having a solution viscosity ($\eta_{rel}$) Of greater than about 1.07 measured from a methylene chloride solution containing 0.5% of the poly(block-phosphonato-ester) and/or poly(block-phosphonato-cabonate) of the invention dissolved in the methylene chloride at 23° C. (unless otherwise noted, the $\eta_{rel}$ of poly(block-phosphonato-ester) and/or poly(block-phosphonato-cabonate) of the invention is determined using this method). In embodiments including oligomeric phosphonates and/or polyphosphonates having molecular weights ($M_w$) from about 3,000 to about 35,000 g/mol, the poly(block-phosphonato-ester) and/or poly(block-phosphonato-cabonate) may be characterized as having an $\eta_{rel}$ of from about 1.2 to about 1.6.

The $T_g$ of poly(block-phosphonato-ester) and/or poly(block-phosphonato-cabonate) of embodiments of the invention may depend on the biphenol used in the preparation of the oligomeric phosphonates and/or polyphosphonates used and may be greater than about 100° C. in some embodiments, greater than about 125° C. in others, and greater than about 135° C. in still other embodiments, and the phosphorous content of the poly(block-phosphonato-ester) and/or poly(block-phosphonato-cabonate) of the invention may be greater than about 1.5% in some embodiments, and in other embodiments, the phosphorous content may be greater than about 2.7%, or, in some embodiments, greater than about 9% up to greater than 10%. As discussed hereinabove, high phosphorous content may be achieved using bisphenols such as, resorcinol, hydroquinone, and the like in the preparation of oligomeric phosphonates and/or polyphosphonates.

In certain embodiments of the invention, poly(block-phosphonato-ester) and/or poly(block-phosphonato-cabonate) of the invention are produced as described above with the addition of a second heating step after the evolution of volatile by-products has stopped. For example, oligomeric phosphonates and/or polyphosphonates may be combined with polyesters and/or polycarbonates and a transesterification catalyst may be provided to form a reaction mixture. The reaction mixture may then be heated and volatile by-products may be removed. Therefore in some embodiments of the invention, the reaction mixture may be heated for at least about 5 hours after the evolution of volatile by-products has stopped. The addition of a second heating step may allow for an increase in the molecular weight ($M_n$) of the resulting poly(block-phosphonato-ester) and/or poly(block-phosphonato-cabonate).

In some embodiments of the invention, a polymer composition may include at least one poly(block-phosphonato-ester) and/or poly(block-phosphonato-cabonate) of embodiments of the invention with at least one other polymer to create a polymer blend. Non-limiting examples of polymers and plastics that may be mixed with the poly(block-phosphonato-ester) and/or polyblock-phosphonato-cabonate) of the invention include polycarbonate (PC), polyacrylate, polyacrylonitrile, polyester, such as, but not limited to polyethylene terephthalate (PET) and polybutylene terephthalate (PBT), polyamide (PA), such as, but not limited to, PA 6, PA 6.6, and PA 4.6, polystyrene, high-impact polystyrene (HIPS), polyurethane, polyurea, polyepoxy, poly(acrylonitrile butadiene styrene) (ABS), ABS/PC, polyamides, polyimide, polyarylate, poly(arylene ether), polyethylene, polypropylene, polyphenylene oxide (PPO), PPO/HIPS, polyphenylene sulfide, poly(vinyl ester), polyvinyl chloride, bismaleimide polymer, polyanhydride, liquid crystalline polymer, cellulose polymer, or any combination thereof.

Polymer blends of embodiments of the invention may also include compatibilizers such as, but not limited to, acrylonitrile-styrenes acrylate (ASA), styrene-maleic anhydride (SMA), and SMI. In certain embodiments, compatibilizers may be that do not contain halogens may be used.

The polymer composition may be produced by blending, mixing, or compounding the constituent polymers using a melt process. In some embodiments, the melt processing of poly(block-phosphonato-ester) and/or poly(block-phosphonato-cabonate) with other polymers may result in a polymer blend which may be a block polymer blend having improved properties such as, for example flame resistance (high limiting oxygen index, LOI), high heat stability (minimal Tg depression), high toughness, low color, and the like or a combination of these properties.

In still other embodiments, the polyblock-phosphonato-ester) and/or poly(block-phosphonato-cabonate) or polymer blends, which may be block polymer blends including the block polymers, may also contain other components, such as, for example, fillers, such as, glass fibers, UV stabilizers, surfactants, organic binders, polymeric binders, crosslinking agents, coupling agents, anti-dripping agents, heat stabilizers, colorants, inks, dyes, and the like or any combination of these. In some embodiments, antioxidants, including, but not limited to, sterically hindered phenols and sterically hindered phosphites, may be added to the poly(block-phosphonato-ester) and/or poly(block-phosphonato-cabonate) compositions of polymer blends which may be block polymer blends, Another embodiment of the invention includes articles of manufacture produced from the poly(block-phosphonato-ester) and/or poly(block-phosphonato-cabonate) of the invention or from polymer blend including these poly(block-phosphonato-ester) and/or poly(block-phosphonato-cabonate), and in yet other embodiments, the poly(block-phosphonato-ester) and/or polyblock-phosphonato-cabonate) or polymer blends including them may be used to make housings for electronics such as, but not limited to, radios, televisions, computers, computer monitors, telephones, cell phones, and the like or as coatings on films, fibers such as cloth or clothes, foams, molded articles, fiber reinforced composites metals, wire, and the like.

EXAMPLE 1

10 grams of low molecular weight oligomeric phosphonate (prepared in a melt transesterification process using 1190 g of bisphenol A, 18.5 mole percent excess phosphodiester (1595.5 g, Methyldiphenoxy-phosphine oxide), 0.6 mole percent low carbon branching compound 1,1,1-tris(4-hydroxyphenyl)ethane (9.2 g) and a sodium phenolate catalyst (150 milligrams) dried overnight at 40° C. at 2 mbar with a $T_g$ 90° C. and $\eta_{rel}$ 1.10))and 30 grams of high viscosity polycarbonate (based on bisphenol A) like Makraolon 3103 from Bayer and 12 mg of tetraphenylphosphonium phenolate transesterification catalyst were combined for 2 hours at 300° C. in a vessel at reduced pressure to remove volatile reaction products. A film of the product cast from methylene chloride solution after drying was characterized and determined to have a $T_g$ 133-134° C., $\eta_{rel}$ 1.28-1.29, and a phosphorous content of about 2.72%.

EXAMPLE 2

9.2 grams of a low molecular weight oligomeric phosphonate (low MW phosphonate oligomer prepared by reacting 207.9 grams of methyldiphenoxy-phosphine oxide with 177.2 g bisphenol A, 21.4 g of trisphenol phosphate, and 0.054 g of phosphonium phenolate catalyst for 7 hours with heating and vacuum to produce 191.4 grams of product phosphonate oligomer with a $T_g$ 70° C. and $\eta_{rel}$ 1.09) was mixed with 30.8 g of Makrolon 3103 dried at 80° C. under reduced pressure overnight and 12 milligrams of tetraphenylphosphonium phenolate catalyst and heated for 2 hours at 300° C. under vacuum to remove generated by-products. The resulting product was 39.8 grams of poly(phosphonatocabonate) with $T_g$ 140° C., $\eta_{rel}$ 1.29; IR P-O_C peak at 935 cm$^{-1}$ and phosphorous content (found) of 1.98%.

EXAMPLE 3

10 grams of a low molecular weight oligophosphonate (low MW resorcinol phosphonate oligomer prepared by reacting 75.9 grams of methyldiphenoxy-phosphine oxide with 32.2 g resorcinol, 0.92 g of trisphenol phosphate, and 24 mg of tetraphenyiphosphonium phenolate catalyst for the first day of heating with reduced pressure (66.5 g by-product removed) and 24 mg phosphonium phenolate catalyst on the second day of heating with reduced pressure (5.8 g by-product removed) to produce 35 grams of product phosphonate oligomer with a $T_g$ 28° C. and $\eta_{rel}$ 1.05) was mixed with 30 g of Makrolon 3103, dried at 80° C. under reduced pressure overnight, and 12 milligrams of phosphonium phenolate catalyst and heated for 4 hours at 300° C. under vacuum to remove generated by-products. The result was a yellowish poly(phosphonatocaboonate) with a $T_g$ 109° C., $\eta_{rel}$ 1.27, and phosphorous content (found) of 4.31%.

EXAMPLE 4

10 grams of a low molecular weight oligo-phosphonate (low MW hydroquinone phosphonate oligomer prepared by reacting 276.6 grams of methyldiphenoxy-phosphine oxide with 110.7 g hydroquinone, 28.5 g of trisphenol phosphate, and 72 mg of tetraphenylphosphonium. phenolate catalyst for the first day of heating with reduced pressure and 72 mg tetraphenylphosphonium phenolate catalyst on the second day of heating with reduced pressure to produce 132 grams of product phosphonate oligomer with a $T_g$ 51° C. and $\eta_{rel}$ 1.05) was mixed with 30 g of Makrolon 3103 dried at 80° C. under reduced pressure overnight, and with 12 milligrams of tetraphenylphosphonium phenolate catalyst and heated for 3.5 hours at about 300° C. under vacuum to remove generated by-products, 0.3 g. 39.7 g product poly(phosphonatocabonate) with a $T_g$ 125° C., $\eta_{rel}$ 1.32, and phosphorous content (found) 4.29% was produced.

EXAMPLE 5

20 grams of a low molecular weight oligo-phosphonate (low MW phosphonate oligomer as prepared in Example 1) was mixed with 20 g of Makrolon 3103 dried at 80° C. under reduced pressure overnight, and 12 milligrams of tetraphenylphosphonium phenolate catalyst and heated for 3.5 hours at about 300° C. under vacuum to remove generated by-products. The final product was a poly(phosphonatocarbonate) with a $T_g$ 123° C. and $\eta_{rel}$ 1.32.

EXAMPLE 6

1057.4 g P-diester (97.5% purity methyldiphenoxy-phosphine oxide), 792.5 g Bisphenol A, 6.13 g 1,1,1 Tris(4-hydroxyphenyl) ethane and 100 mg Na-phenolate ×1H$_2$O were mixed together and reacted in a melt (reaction temperature increasing from ~239-281° C., at the same time pressure decreasing from 150-0.2 mbar) to prepare an oligomeric phosphonate of $\eta_{rel}$ 1.15. During the reaction, all formed phenol had been distilled off using a column for separation, after the reaction the excess of P-diester also had been distilled off 440 g of the oligomeric phosphonate was pressed out of the reactor as melt, and 1800 g Makrolon 3103 and 720 mg Tetraphenylphosphonium phenolate catalyst were then added to the residual oligomeric phosphonate. All had been reacted in the melt, under distilling off of all volatiles and under the following conditions in a metal reactor and pressed out as melt strand after reaction:

| Time | Reaction Temp. (° C.) | Pressure (mbar) |
|---|---|---|
| 7:25 | | |
| 9:00 | 246 | 150 |
| 9:45 | 239 | 150 |
| 10:30 | 249 | 100 |
| 11:00 | 251 | 80 |
| 11:30 | 250 | 40 |
| 11:45 | 247 | 25 |
| 12:00 | 242 | 15 |
| 12:15 | 239 | 7.5 |
| 12:30 | 239 | 4 |
| 13:45 | 253 | 3.5 |
| 14:00 | 268 | 1.0 |
| 14:05 | 270 | 1.0 |
| 14:30 | 280 | 1.0 |
| 15:00 | 280 | 0.4 |
| 15:30 | 280 | 0.25 |
| 16:00 | 281 | 0.2 |
| 16:45 | 282 | 988 |
| 16:50 | 286 | 933 |
| 17:15 | 296 | 1 |
| 17:30 | 299 | 0.2 |
| 17:45 | 302 | 0.2 |
| 18:00 | 303 | 0.2 |
| 18:15 | 303 | 0.2 |
| 18:20 | 300 | — |
| 18:30 | 302 | 0.2 |
| 18:45 | 304 | 0.2 |
| 19:00 | 303 | 0.2 |
| 19:10 | 303 | 0.2 |

Yield: 2280 g Polyphosphonate-carbonate out of the reactor $\eta_{rel}$=1.27

Tg=135° C. (one peak)

EXAMPLE 7

734.3 g P-diester (97.5% purity, methyldiphenoxy-phosphine oxide), 311.1 g P-diester (98% purity), 926 g Bisphenol A, 112 g Triphenylphosphate and 282 mg Tetraphenylphosphonium phenolate were mixed together and reacted in a melt (reaction temperature increasing from ~241-300° C., at the same time pressure decreasing from 150-0.5 mbar) to prepare an oligomeric phosphonate of $\eta_{rel}$ 1.07. During the reaction, all formed phenol had been distilled off using a column for separation, after the reaction the excess of P-diester also had been distilled off. The amount of distillate was 963 g.

333 g of the oligomeric phosphonate was pressed out of the reactor as melt, and 1800 g of Makrolon 3103 and 2×720 mg tetraphenylphosphonium phenolate catalyst were added to the residual oligomeric phosphonate. All had been reacted in the melt, under distilling off of all volatiles and under the following conditions in a metal reactor and pressed out as melt strand after reaction:

| Time | Reaction Temp. (° C.) | Pressure (mbar) |
|---|---|---|
| 6:45 | 41 | 995 |
| 8:00 | 241 | 150 |
| 9:00 | 241 | 150 |
| 9:30 | 251 | 100 |
| 10:00 | 253 | 80 |
| 10:30 | 252 | 40 |
| 11:00 | 246 | 15 |
| 11:30 | 242 | 5 |
| 12:00 | 246 | 4 |
| 12:30 | 255 | 4 |
| 13:00 | 256 | 4 |
| 13:30 | 257 | 2.5 |
| 14:00 | 259 | 4.0 |
| 15:00 | 279 | 0.5 |
| 15:30 | 280 | 0.4 |
| 16:00 | 298 | 0.5 |
| 16:30 | 300 | 0.5 |
| 16:50 | 280 | 998 |
| 16:55 | 280 | 998 |
| 17:00 | 290 | 16 |
| 17:15 | 297 | 0.3 |
| 17:30 | 300 | 0.3 |
| 17:45 | 300 | 0.3 |
| 18:00 | 298 | 0.2 |
| 18:15 | 298 | 0.2 |
| 18:30 | 298 | 0.2 |
| 18:45 | 299 | 0.2 |
| 19:00 | 300 | 0.2 |
| 19:15 | 300 | 0.2 |
| 19:30 | 300 | 0.2 |
| 19:45 | 300 | 0.2 |
| 20:00 | 300 | 0.2 |
| 20:30 | 299 | 0.2 |
| 21:00 | 300 | 0.2 |
| 21:15 | 300 | 0.2 |
| 21:30 | 300 | 0.2 |
| 21:45 | 300 | 0.2 |
| 22:00 | 300 | 0.2 |
| 22:15 | 301 | 0.2 |
| 22:30 | 300 | 0.2 |

Yield: 2497 g Polyphosphonate-carbonate out of the reactor $\eta_{rel}$=1.27

Tg=131° C. (one peak)

EXAMPLE 8

1041.7 g P-diester (98% purity, Methyldiphenoxy-phosphine oxide), 926 g Bisphenol A, 112 g Triphenylphosphate and 282 mg Tetraphenyiphosphonium. Phenolate were mixed together and reacted in a melt (reaction temperature increasing from ~239-300° C., at the same time pressure decreasing from 150-0.5 mbar) to prepare an oligomeric phosphonate of $\eta_{rel}$ 1.08. During the reaction, all formed phenol had been distilled off using a column for separation, after the reaction the excess of P-diester also was distilled off.

1000 g Makrolon 3103 and 3×600 mg tetraphenylphosphonium phenolate catalyst was then added to the oligomeric phosphonate. All had been reacted in the melt, under distilling off of all volatiles and under the following conditions in a metal reactor and pressed out as melt strand after reaction:

| Time | Reaction Temp. (° C.) | Pressure (mbar) |
|---|---|---|
| 6:30 | 52 | 999 |
| 7:45 | 239 | 150 |
| 8:45 | 241 | 150 |
| 9:00 | 249 | 100 |
| 9:30 | 251 | 80 |
| 10:00 | 254 | 80 |
| 10:15 | 253 | 40 |
| 10:30 | 251 | 25 |
| 10:45 | 248 | 15 |
| 11:00 | 243 | 7.5 |
| 11:30 | 245 | 5 |
| 12:00 | 248 | 5 |
| 12:30 | 256 | 4.5 |
| 13:00 | 257 | 3 |
| 13:30 | 257 | 3 |
| 13:45 | 259 | 2.7 |
| 15:00 | 281 | 0.55 |
| 15:30 | 297 | 0.55 |
| 16:00 | 300 | 0.5 |
| 16:30 | 297 | 0.5 |
| 16:43 | 272 | 998 |
| 17:00 | 292 | 0.5 |
| 17:15 | 296 | 0.4 |
| 17:30 | 297 | 0.4 |
| 17:45 | 300 | 0.4 |
| 18:00 | 298 | 0.4 |
| 18:05 | 298 | 0.4 |
| 18:15 | 300 | 0.4 |
| 18:30 | 300 | 0.4 |
| 19:00 | 300 | 0.4 |
| 19:30 | 300 | 0.4 |
| 20:00 | 300 | 0.4 |
| 20:30 | 301 | 0.4 |
| 20:45 | 301 | 0.4 |
| 21:00 | 301 | 0.4 |
| 21:15 | 299 | 0.4 |
| 21:30 | 300 | 0.4 |
| 21:40 | 300 | 0.4 |
| 22:00 | 300 | 0.4 |
| 22:15 | 301 | 0.4 |
| 22:30 | 300 | 0.4 |
| 22:45 | 300 | 0.4 |
| 23:00 | 300 | 0.4 |
| 23:15 | 300 | 0.4 |
| 23:30 | 300 | 0.4 |

Distillate=35.2 g (after adding Makrolon)
Yield: 1974 g Polyphosphonate-carbonate out of the reactor
$\eta_{rel}$=1.30
Tg=124° C. (one peak)

EXAMPLE 9

1164 g P-diester (97.8% purity, methyldiphenoxy-phosphine oxide), 532 g P-diester (94.8% purity), 718 g Resorcinol, 20 g 1,1,1 Tris(4-hydroxyphenyl) ethane and 532 mng Tetraphenylphosphonium phenolate were mixed together and reacted in a melt (reaction temperature increasing from ~239-299° C., at the same time pressure decreasing from 150-0.6 mbar) to prepare an oligomeric phosphonate of $\eta_{rel}$ 1.08. During the reaction, all formed phenol had been distilled off using a column for separation, after the reaction the excess of P-diester also was also distilled off.

172 g of the oligomeric phosphonate was pressed out of the reactor as melt, and 1800 g Makrolon 3103 and 2×720 mg tetraphenylphosphonium phenolate catalyst was added to the residual. All had been reacted in the melt, under distilling off of all volatiles and under the following conditions in a metal reactor and pressed out as melt strand after reaction:

| Time | Reaction Temp. (° C.) | Pressure (mbar) |
|---|---|---|
| 6:30 | 26 | 996 |
| 7:30 | 236 | 150 |
| 8:30 | 239 | 100 |
| 9:30 | 246 | 80 |
| 10:00 | 241 | 40 |
| 10:30 | 237 | 25 |
| 10:45 | 241 | 25 |
| 11:00 | 241 | 20 |
| 11:15 | 242 | 15 |
| 11:30 | 254 | 40 |
| 11:45 | 256 | 40 |
| 12:00 | 259 | 40 |
| 12:30 | 263 | 38 |
| 13:00 | 265 | 30 |
| 13:15 | 267 | 29 |
| 13:30 | 267 | 25 |
| 14:00 | 273 | 25 |
| 14:30 | 279 | 25 |
| 14:45 | 279 | 15 |
| 15:00 | 277 | 6 |
| 15:15 | 277 | 5 |
| 15:30 | 279 | 0.9 |
| 16:00 | 281 | 0.9 |
| 16:30 | 298 | 0.6 |
| 17:00 | 299 | 0.6 |
| 17:15 | 262 | 998 |
| 17:25 | 281 | 16 |
| 17:30 | 287 | 0.7 |
| 17:45 | 291 | 0.7 |
| 18:00 | 305 | 0.7 |
| 18:15 | 292 | 1000 |

Yield: 2634 g Polyphosphonate-carbonate out of the reactor
$\eta_{rel}$ 1.57-1.59
Tg 102° C. (one peak)

EXAMPLE 10

218.7 g P-diester (97.3% purity, methyldiphenoxy-phosphine oxide), 493.8 g P-diester (94.8% purity), 404 g P-diester (98% purity), 476.4 P-diester (96.4% purity), 654 g Hydroquinone, 169 g Triphenylphosphate and 425 mg Tetraphenylphosphonium phenolate were mixed together and reacted in a melt (reaction temperature increasing from ~234-298° C., at the same time pressure decreasing from 150-0.4 mbar) to prepare an polphosphonate of $\eta_{rel}$ 1.33. During the reaction, all formed phenol was distilled off using a column for separation, after the reaction the excess of P-diester was also distilled off.

193 g of Polyphosphonate was pressed out of the reactor as melt, and 1800 g Makrolon 3103 was added to the residual polyphosphonate. All had been reacted in the melt, under distilling off of all volatiles and under the following conditions in a metal reactor and pressed out as melt strand after reaction:

| Time | Reaction Temp. (° C.) | Pressure (mbar) |
|---|---|---|
| 6:30 | 50 | 1000 |
| 7:30 | 234 | 150 |
| 8:30 | 241 | 150 |
| 9:00 | 247 | 100 |
| 9:30 | 250 | 80 |
| 10:00 | 247 | 40 |
| 10:30 | 251 | 40 |
| 11:00 | 251 | 30 |
| 11:30 | 256 | 30 |
| 12:00 | 256 | 20 |
| 12:30 | 254 | 6 |
| 13:00 | 254 | 5.5 |
| 13:30 | 255 | 5 |
| 14:00 | 277 | 1.2 |
| 14:30 | 280 | 0.9 |
| 15:00 | 280 | 0.8 |
| 15:30 | 298 | 1.0 |
| 15:45 | 298 | 0.6 |
| 16:00 | 297 | 0.4 |
| 16:10 | 298 | 0.4 |
| 16:30 | 273 | 881 |
| 16:45 | 285 | 160 |
| 17:00 | 291 | 3.5 |
| 17:15 | 297 | 0.4 |
| 17:30 | 299 | 0.4 |
| 17:45 | 300 | 0.3 |
| 18:00 | 300 | 0.3 |
| 18:07 | 300 | 0.3 |
| 18:13 | 300 | 0.3 |

Yield: 2454 g Polyphosphonate-carbonate out of the reactor $\eta_{rel}$=1.32

Tg=118° C. (one peak)

Although the present invention has been described in considerable detail with reference to certain preferred embodiments thereof, other versions are possible. Therefore the spirit and scope of the appended claims should not be limited to the description and the preferred versions contain within this specification.

EXAMPLE 11

Zimmer-25

1575 g P-diester (98.2% purity, methyldiphenoxy-phosphine oxide), 1189 g Bisphenol A, 9.3 g 1,1,1 Tris(4-hydroxyphenyl) ethane and 150 mg Na-phenolate ×1H$_2$O were mixed together and reacted in a melt (reaction temperature increasing from ~239-300° C., at the same time pressure decreasing from 150-0.5 mbar) to prepare an oligomeric phosphonate. During the reaction, all formed phenol had been distilled off using a column for separation, after the reaction the excess of P-diester also had been distilled off The amount of the distillate was 994.2 g. This process took ~540 minutes.

4108 g Makrolon 3103 and 2×1000 mg tetraphenylphosphonium phenolate catalyst was then added to the oligomeric phosphonate. All had been reacted in the melt, under distilling off of all volatiles and pressed out as melt strand after 500 minutes reaction time with amount of distillate 320.1 g.

The yield of Polyphosphonate-carbonate out of the reactor was 5390 g.

The properties of the product as a stand alone:
a. $\eta_{rel}$=1.22
b. Tg=132° C.
c. Melt viscosity at 250° C./2.16 kg=22.4 g/10 min (compare to Polycarbonate Makrolon 3103 at 3.7 g/10 min)
d. Impact Strength, Unnotched Izod (4J pendulum)=not broken
e. Flammability UL-94 for 1.6 mm test bar=V0
f. HDT (with 264 psi load)=111° C.

The properties of the product blend with 15% ABS:
g. Flammability UL-94 for 1.6 mm test bar=V0
h. HDT (with 264 psi load)=101° C.

EXAMPLE 12

Zimmer-27

1278 g P-diester (96.8% purity, methyldiphenoxyphosphine oxide), 951.2 g Bisphenol A, 7.3 g 1,1,1-Tris(4-hydroxyphenyl)ethane and 120 mg Na-phenolate×1H$_2$O were mixed together and reacted in a melt (reaction temperature increasing from ~239-300° C., at the same time pressure decreasing from 150-0.5 mbar) to prepare an oligomeric phosphonate of $\eta_{rel}$ 1.07. During the reaction, all formed phenol had been distilled off using a column for separation, after the reaction the excess of P-diester also had been distilled off. The amount of the distillate was 767.2 g. This process took ~330 minutes.

3453 g Makrolon 3103 and 2×1000 mg+2×800 mg tetraphenylphosphonium phenolate catalyst was then added. All had been reacted in the melt, under distilling off of all volatiles and pressed out as melt strand after 585 minutes reaction time with amount of distillate 289.3 g.

The yield of Polyphosphonate-carbonate out of the reactor was 4519 g.

The properties of the product as a stand alone:
a. $\eta_{rel}$=1.24
b. Tg=132° C.
c. Melt viscosity at 250° C./2.16 kg=15.1 g/10 min (compare to Polycarbonate Makrolon 3103 at 3.7 g/10 min)
d. Impact Strength, Unnotched Izod (4J pendulum)=not broken
e. Flammability UL-94 for 1.6 mm test bar=V0
f. HDT (with 264 psi load)=119° C.

EXAMPLE 13

Zimmer-35

3662.8 g P-diester (98.9% purity, methyldiphenoxy-phosphine oxide), 3329 g Bisphenol A, and 1200 mg tetraphenylphosphonium phenolate were mixed together and reacted in a melt (reaction temperature increasing from ~239-300° C., at the same time pressure decreasing from 150-0.5 mbar) to prepare an oligomeric phosphonate of $\eta_{rel}$ 1.05. During the reaction, all formed phenol had been distilled off using a column for separation, after the reaction the excess of P-diester also had been distilled off. The amount of the distillate was 2867.8 g. This process took ~360 minutes.

1100 g Makrolon 3103 and 2×1200 mg tetraphenylphosphonium phenolate and 1×600 mg Na-phenolate×1H$_2$O catalyst were then added to the oligomeric phosphonate. All had been reacted in the melt, under distilling off of all volatiles and pressed out as melt strand after 615 minutes reaction time with amount of distillate 373.9 g.

The yield of Polyphosphonate-carbonate out of the reactor was 4780 g.

The properties of the product as a stand alone:
a. $\eta_{rel}$=1.23
b. Tg=112° C.
c. Melt viscosity at 250° C./2.16 kg=316 g/10 min (compare to Polycarbonate Makrolon 3103 at 3.7 g/10 min)

d. Impact strength, Unnotched Izod (4J pendulum) 5.26 ft-1bf/in

The properties of the product with PBT/GF (the composition were 73% PBT with 30% GF, 26% of the product example 13, 0.4% Teflon and 0.6% masterbatch of 0.1% C4 salt and 0.5% PC):

e. Flammability UL-94 for 0.8 mm test bar=V0
f. Flammability UL-94 for 1.6 mm test bar=V0

COMPARATIVE EXAMPLE 14

FX-266-1A; Random Polyphosphonate-Carbonate
From: BPA, P-Diester and DPC 12.4 g P-diester (96.5% purity, methyldiphenoxy-phosphine oxide), 38.02 g Bisphenol A, 29.65 Diphenylcarbonate and 5 mg Na-phenolate×1H$_2$O were mixed together and reacted in a melt (reaction temperature increasing from ~239-300° C., at the same time pressure decreasing from 150-0.5 mbar) to prepare an oligomeric phosphonate. During the reaction, all formed phenol was distilled off using a column for separation, after the reaction the excess of P-diester was also distilled off, The amount of the distillate was 36.2 g. This process took ~360 minutes.

The column was then removed and additional 12 mg tetraphenylphosphonium phenolate catalyst was added to the oligomeric phosphonate. All had been reacted in the melt, under distilling off of all volatiles and pressed out as melt strand after 305 minutes reaction time with amount of distillate 1.9 g.

The yield of polyhosphonate-carbonate out of the reactor was 38.62 g with $\eta_{rel}$ 1.18 and Tg 126° C., the material was very brittle like polyphosphonate with no ester or carbonate structures.

What is claimed is:

1. A polymer comprising:
   at least one phosphonate oligomer or polyphosphonate block; and
   one or more polyester, polycarbonate, or combination thereof covalently linked to the at least one phosphonate oligomer or polyphosphonate to form a poly(block-phosphonato-ester) or poly(block-phosphonato-cabonate);
   wherein covalent linkages are between the at least one phosphonate oligomer or polyphosphonate and the one or more polyester, polycarbonate, or combination thereof to provide a block polymer having a single glass transition temperature ($T_g$).

2. The polymer of claim 1, wherein the at least one phosphonate oligomer or polyphosphonate and the one or more polyester, polycarbonate, or combination thereof is linked by a transesterification polycondensation.

3. The polymer of claim 1, wherein the phosphonate oligomer or polyphosphonate has a solution viscosity ($\eta_{rel}$) of from about 1.03 to greater than about 1.35.

4. The polymer of claim 1, wherein the phosphonate oligomer or polyphosphonate has a $T_g$ of from about 28° C. to about 107° C.

5. The polymer of claim 1, wherein the phosphonate oligomer or polyphosphonate is selected from linear or branched phosphonate oligomers or polyphosphonates or combinations thereof.

6. The polymer of claim 5, wherein the branched phosphonate oligomers or polyphosphonates are prepared with up to about 50 mol % branching agent.

7. The polymer of claim 1, wherein the phosphonate oligomer or polyphosphonate has a $M_n$ of from about 2,000 g/mol to about 35,000 g/mol.

8. The polymer of claim 1, wherein the phosphonate oligomer or polyphosphonate is prepared from at least a stoichiometrically imbalanced mixture of a phosphonic acid diaryl ester and a bisphenol.

9. The polymer of claim 1, wherein the polyester, polycarbonate, or combination thereof has a $M_w$ of from about 20,000 g/mol to about 35,000 g/mol.

10. The polymer of claim 1 wherein the polyester is selected from aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, poly(butylene adipate), poly(hexamethylene sebacate), aromatic and aliphatic co-polyesters and combinations thereof.

11. The polymer of claim 1, further comprising a second polymer.

12. The polymer of claim 11, wherein the second polymer is selected from plastics, polycarbonates (PCs), polyacrylonitriles, polystyrenes, polyamides, glassfilled polyamides, non-glassfilled polyamides, PA 6, PA 6.6, PA 4.6, polyesters, glassfilled polyester, non-glassfilled polyester, polyethylene terephthalate (PET), polybutylene terephthalate (PBT), polyurethanes, polyureas, polyepoxys, polyimides, polyarylate, poly(arylene ether), polyethylene, polyethylene oxide, polyphenylene sulfide, polypropylene, polyphenylene oxide (PPO), poly(vinyl ester), polyvinyl chloride, bismaleimide polymer, polyanhydride, polyacrylonitrile butadiene styrenes (ABSs), ABS/PCs, high-impact polystyrenes (HIPS), PPO/HIPS, liquid crystalline polymer, cellulose polymer, or combinations thereof.

13. The polymer of claim 11, wherein the second polymer is blended with the poly(block-phosphonato-ester) or poly(block-phosphonato-cabonate) using a melt process and, optionally, vacuum stripping.

14. A method for making a polymer comprising:
    combining at least one phosphonate oligomer or polyphosphonate with one or more polyester, polycarbonate, or combinations thereof to form a mixture;
    providing a transesterification catalyst wherein a reaction mixture is formed when the transesterification catalyst is provided;
    heating the reaction mixture; and
    removing volatile reaction by-products;
    wherein the steps of heating the reaction mixture and removing volatile reaction by-products results in a transetserification polycondensation whereby covalent linkages are formed between the at least one phosphonate oligomer or polyphosphonate and one or more polyester, polycarbonate, or combination thereof resulting in a block polymer have a single glass transition temperature ($T_g$); and
    wherein a poly(block-phosphonato-ester) or poly(block-phosphonato-cabonate) is formed when substantially no volatile reaction by-products are being generated.

15. The method of claim 14, further comprising a second heating step wherein the poly(block-phosphonato-ester) or poly(block-phosphonato-cabonate) is heated for at least about 5 hours.

16. The method of claim 15, wherein the $M_n$ of the polymer is increased following the second heating step.

17. The method of claim 14, wherein the polyphosphonate oligomer or polyphosphonate is from at least about 20 wt % to about 99.5 wt % relative to the total weight of the poly(block-phosphonato-ester) or poly(block-phosphonato-cabonate).

18. The method of claim 14, wherein the polyphosonate oligomer or polyphosphonate is from at least about 0.5 wt % to about 20 wt % relative to the total weight of the poly(block-phosphonato-ester) or poly(block-phosphonato-cabonate).

19. The method of claim 14, wherein the transesterification catalyst is provided with the at least one phosphonate oligomer or polyphosphonate and the transesterification catalyst is used in a reaction for preparing the phosphonate oligomer or polyphosphonate.

20. The method of claim 14, wherein the transesterification catalyst is provided by the step of adding a transesterification catalyst.

21. The method of claim 14, wherein the transesterification catalyst is selected from basic transesterification catalysts.

22. The method of claim 14, further comprising blending the poly(block-phosphonato-ester) or poly(block-phosphonato-carbonate) with a second polymer.

23. The method of claim 22, wherein the blending comprises:
melt blending the poly(block-phosphonato-ester) or poly(block-phosphonato-cabonate) with the second polymer; and
optionally, removing volatile by-products.

24. The method of claim 22, wherein the second polymer is selected from plastics, polycarbonates (PCs), polyacrylonitriles, polystyrenes, polyamides, polyesters, polyurethanes, polyureas, polyepoxys, polyimides, polyarylate, poly(arylene ether), polyethylene, polyethylene oxide, polyphenylene sulfide, polypropylene, poly(vinyl ester), polyvinyl chloride, bismaleimide polymer, polyanhydride, polyacrylonitrile butadiene styrenes (ABSs), ABS/PCs, high-impact polystyrenes (HIPSs), liquid crystalline polymer, cellulose polymer, or combinations thereof.

25. The method of claim 14, wherein the phosphonate oligomer or polyphosphonate has a solution viscosity ($\eta_{rel}$) of from about 1.03 to greater than about 1.35.

26. The method of claim 14, wherein the phosphonate oligomer or polyphosphonate has a glass transition temperature ($T_g$) of from about 28° C. to about 107° C.

27. The method of claim 14, wherein the phosphonate oligomer or polyphosphonate is selected from linear or branched phosphonate oligomers or polyphosphonates or combinations thereof.

28. The method of claim 27, wherein the branched phosphonate oligomers or polyphosphonates are prepared with up to about 50 mol % branching agent.

29. The method of claim 14, wherein the phosphonate oligomer or polyphosphonate has a $M_n$ of from about 2,000 g/mol to about 35,000 g/mol.

30. The method of claim 14, wherein the phosphonate oligomer or polyphosphonate is prepared from at least a stoichiometrically imbalanced mixture of a phosphonic acid diaryl ester and a bisphenol.

31. The method of claim 14, wherein the polyester or polycarbonate has a $M_w$ of from about 20,000 g/mol to about 35,000 g/mol.

32. The method of claim 14, wherein the polyester is selected from aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, poly(butylene adipate), poly(hexamethylene sebacate), aromatic and aliphatic co-polyesters and combinations thereof.

33. A poly(block-phosphonato-ester) or poly(block-phosphonato-cabonate) prepared by a method comprising:
combining at least one phosphonate oligomer or polyphosphonate with one or more polyester, polycarbonate or combinations thereof to form a mixture;
providing a transesterification catalyst wherein a reaction mixture is formed when the transesterification catalyst is provided;
heating the reaction mixture; and
removing volatile reaction by-products;
wherein the steps of heating the reaction mixture and removing volatile reaction by-products results in a transesterification polycondensation whereby covalent linkages are formed between the at least one phosphonate oligomer or polyphosphonate and one or more polyester, polycarbonate, or combination thereof resulting in a block polymer having a single glass transition temperature ($T_g$); and
wherein the poly(block-phosphonato-ester) or poly(block-phosphonato-cabonate) is formed when substantially no volatile reaction by-products are being generated.

34. The poly(block-phosphonato-ester) or poly(block-phosphonato-cabonate) of claim 33, wherein the method for preparing the poly(block-phosphonato-ester) or poly(block-phosphonato-cabonate) further comprises a second heating step wherein the poly(block-phosphonato-ester) or poly(block-phosphonato-cabonate) is heated for at least about 5 hours.

35. The poly(block-phosphonato-ester) or poly(block-phosphonato-cabonate) of claim 34, wherein the $M_n$ of the poly(block-phosphonato-ester) or poly(block-phosphonato-cabonate) is increased following the second heating step.

36. The poly(block-phosphonato-ester) or poly(block-phosphonato-cabonate) of claim 33, wherein the polyphosphonate oligomer or polyphosphonate is from at least about 20 wt % to about 99.5 wt % relative to the total weight of the poly(block-phosphonato-ester) or poly(block-phosphonato-cabonate).

37. The poly(block-phosphonato-ester) or poly(block-phosphonato-cabonate) of claim 33, wherein the polyphosphonate oligomer or polyphosphonate is from at least about 0.5 wt % to about 20 wt % relative to the total weight of the poly(block-phosphonato-ester) or poly(block-phosphonato-cabonate).

38. The poly(block-phosphonato-ester) or poly(block-phosphonato-cabonate) of claim 33, wherein the at least one phosphonate oligomer of polyphosphonate and the one or more polyester or polycarbonate is linked by a transesterification, polycondensation, or combinations thereof.

39. A polymer blend comprising:
a poly(block-phosphonato-ester) or poly(block-phosphonato-cabonate) made by transesterification polycondensation whereby covalent linkages are formed between at least one phosphonate oligomer or polyphosphonate and one or more polyester, polycarbonate, or combinations thereof resulting in a block polymer having a single glass transition temperature ($T_g$); and
a second polymer.

40. The polymer blend of claim 39, wherein the poly(block-phosphonato-ester) or poly(block-phosphonato-cabonate) and the second polymer are blended using a melt process.

41. The polymer blend of claim 39, wherein the phosphonate oligomer or polyphosphonate has a solution viscosity ($\eta_{rel}$) of from about 1.03 to greater than about 1.35.

42. The polymer blend of claim 39, wherein the phosphonate oligomer or polyphosphonate has a glass transition temperature ($T_g$) of from about 28° C. to about 107° C.

43. The polymer blend of claim 39, wherein the phosphonate oligomer or polyphosphonate is selected from linear or branched phosphonate oligomers or polyphosphonates or combinations thereof.

44. The polymer blend of claim 43, wherein the branched phosphonate oligomers or polyphosphonates are prepared with up to about 50 mol % branching agent.

45. The polymer blend of claim 39, wherein the phosphonate oligomer or polyphosphonate has a $M_n$ of from about 2,000 g/mol to about 35,000 gmol.

46. The polymer blend of claim 39, wherein the phosphonate oligomer or polyphosphonate is prepared from at least a stoichiometrically imbalanced mixture of a phosphonic acid diaryl ester and a bisphenol.

47. The polymer blend of claim 39, wherein the polyester or polycarbonate has a $M_w$ of from about 20,000 g/mol to about 35,000 g/mol.

48. The polymer blend of claim 39, wherein the polyester is selected from aromatic and aliphatic polyesters, aromatic and aliphatic polycarbonates, polyalkylene terephthalates, polyethylene terephthalate, polyalkylene naphthalates, polyethylene naphthalate, polybutylene terephthalate, polycaprolactone, poly(butylene adipate), poly(hexamethylene sebacate), aromatic and aliphatic co-polyesters and combinations thereof.

49. The polymer blend of claim 39, wherein the second polymer is selected from plastics, polycarbonates (PCs), polyacrylonitriles, polystyrenes, polyamides (PA), PA 6, PA 6.6, PA 4.6, polyesters, polyethylene terephthalate (PET), polybutylene terephthalate (PBT), polyurethanes, polyureas, polyepoxys, polyimides, polyarylate, poly(arylene ether), polyethylene, polyethylene oxide, polyphenylene oxide (PPO), polyphenylene sulfide, polypropylene, poly(vinyl ester), polyvinyl chloride, bismaleimide polymer, polyanhydride, polyacrylonitrile butadiene styrenes (ABSs), ABS/PCs, high-impact polystyrenes (HIPSs), PPO/HIPS, liquid crystalline polymer, cellulose polymer, or combinations thereof.

* * * * *

UNITED STATES PATENT AND TRADEMARK OFFICE
CERTIFICATE OF CORRECTION

| | | |
|---|---|---|
| PATENT NO. | : 7,645,850 B2 | Page 1 of 1 |
| APPLICATION NO. | : 11/463803 | |
| DATED | : January 12, 2010 | |
| INVENTOR(S) | : Dieter Freitag | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Fourteenth Day of December, 2010

David J. Kappos
*Director of the United States Patent and Trademark Office*